Figure 1:
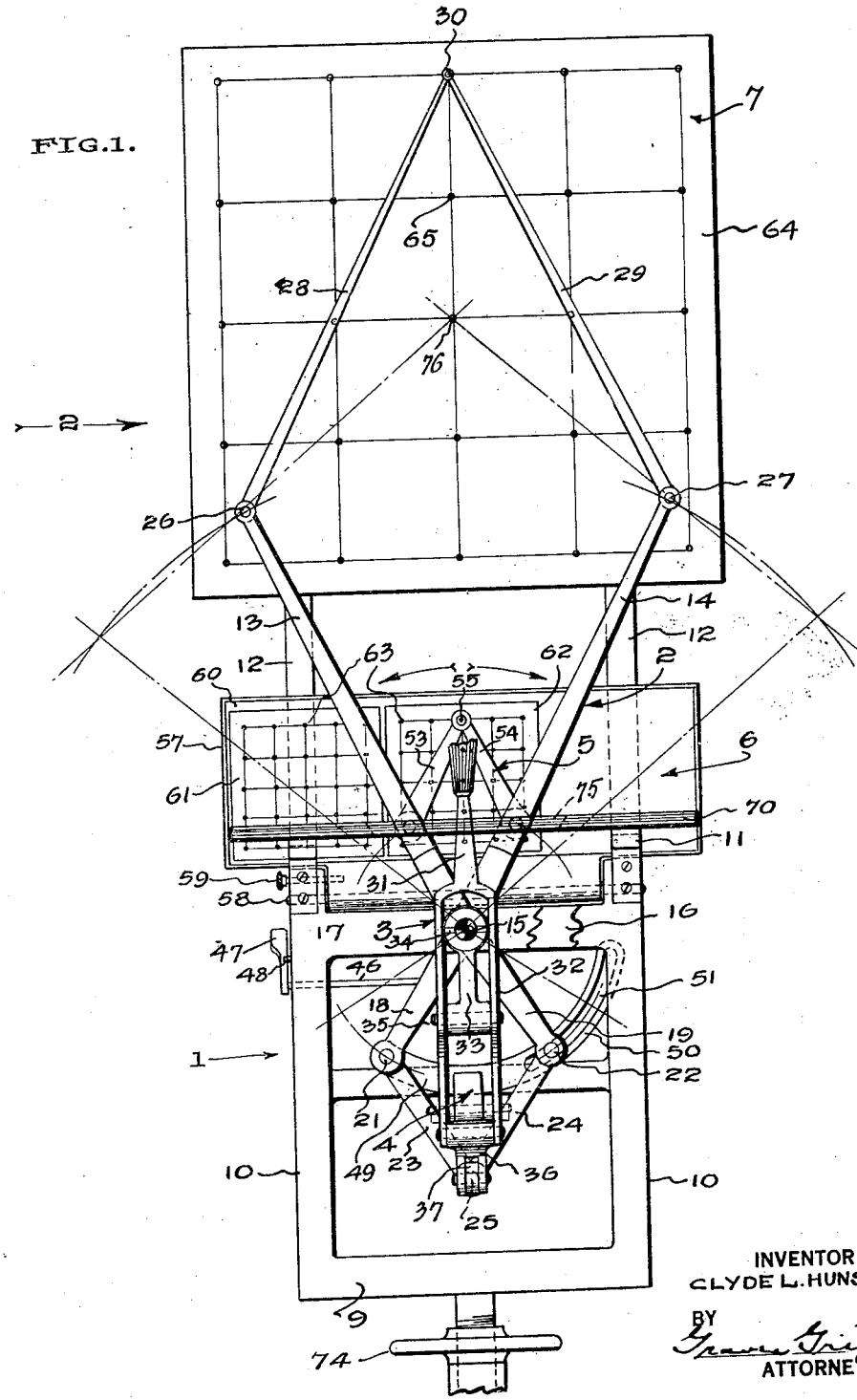

Sept. 28, 1926.

C. L. HUNSICKER 1,601,394

OPHTHALMIC INSTRUMENT FOR AND METHOD OF APPLYING THE HIRSCH EYE TEST

Filed Nov. 14, 1925   2 Sheets-Sheet 1

INVENTOR
CLYDE L. HUNSICKER
BY
ATTORNEY

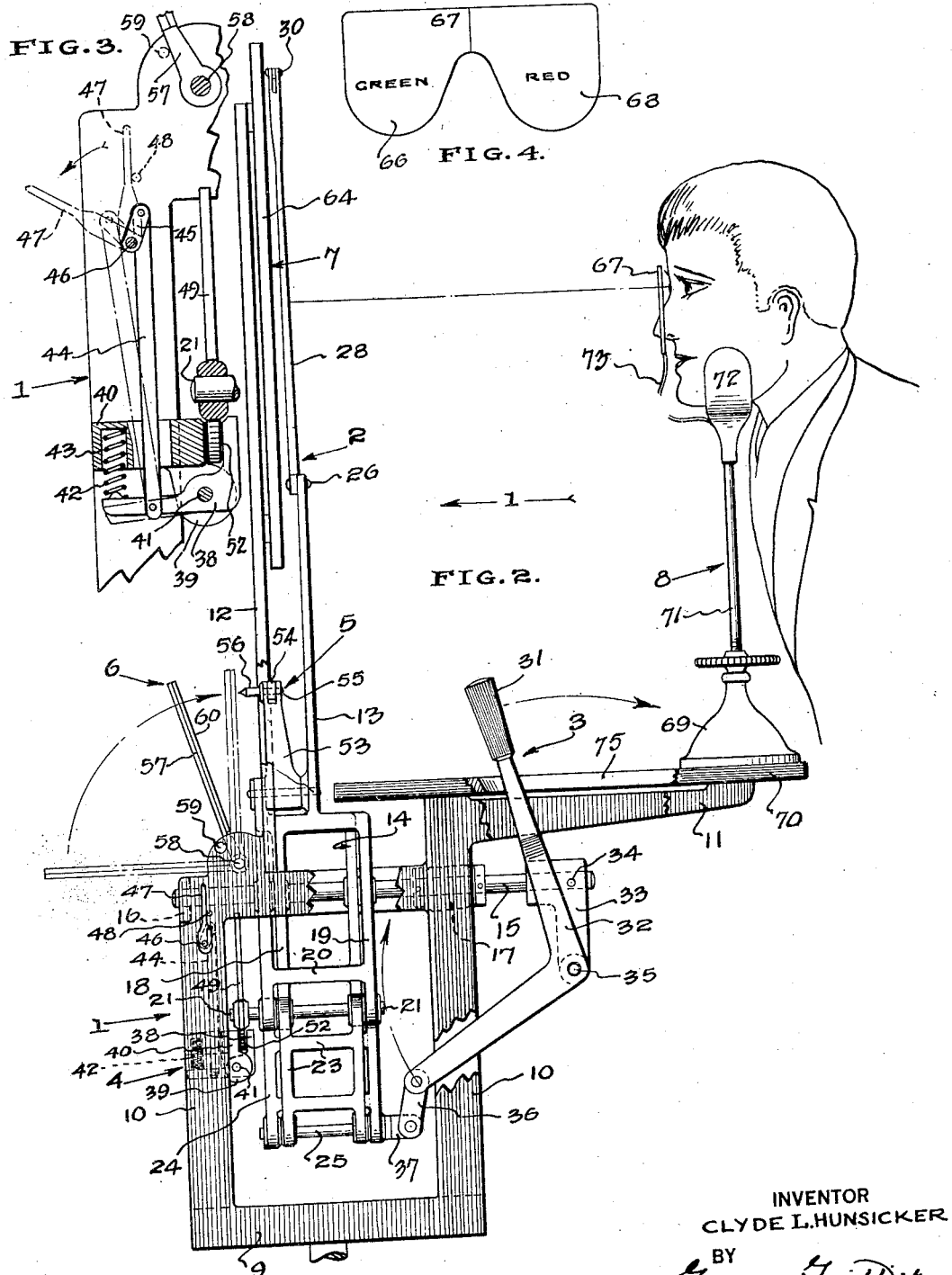

Patented Sept. 28, 1926.

1,601,394

UNITED STATES PATENT OFFICE.

CLYDE L. HUNSICKER, OF SAN FRANCISCO, CALIFORNIA.

OPHTHALMIC INSTRUMENT FOR AND METHOD OF APPLYING THE HIRSCH EYE TEST.

Application filed November 14, 1925. Serial No. 68,946.

The present invention relates to improvements in means for applying the Hirsch test for eye-strains, and has reference more particularly to that type employing the pantographic principle as an aid to patients undergoing examinations for such ailments in recording their efforts at muscular co-ordination in attempts at accurately locating points, or characters, upon a specially prepared chart.

A principal object of my invention is the provision of an instrument and a means for its positive application in connection with the Hirsch eye-strain test, whereby a patient may subject himself to an eye-muscle test for determining their normal co-ordination, or the degree of departure therefrom.

A further object of the invention is the provision of a simple and efficient means for applying the Hirsch test for eye-strain and registering the departure from normal muscular co-ordination upon a suitably prepared and arranged duplicate chart, as indicated through a correlated pantographic action.

Additional to that of the foregoing is to provide a simpler, more efficient and accurate means for applying the Hirsch eye-test, in determining lack of, or inefficient, co-ordination of eye-muscles, in endeavors to orientate the position of points upon a fixed chart and the recordation of variency from normalcy upon an accompanying duplicate chart.

The instrument as here devised is of such simplicity of construction and positiveness and accuracy of operation as to be entrusted to an attendant, thus relieving the specialist of a personal supervision of the test, as is now required.

In applying the Hirsch test for eye strain, there is employed a simple chart of black background divided into squares by intersecting lines, with these points of intersection marked by red dots or indicia. The chart thus prepared is placed before the patient whose eyes are to be tested, the eyes being provided with ray-filters of red and green, with the red filter placed over the eye to be tested. The patient is next provided with a pointer and directed to place the point thereof upon a designated or selected red indicia, the reds being clearly discernable through the red filter, while, when viewed through the green filter, these red indicia become undistinguishable, the green filter causing them to blend with the black background. The patient's degree of lack of accuracy in correctly orientating as between pointer point and the designated indicia, or in placing the pointer point upon the particular point selected, is taken as the gauge of the patients eye normalcy or the degree of departure therefrom.

In the accomplishment of the purposes, as set forth, there is employed the usual Hirsch chart of black back-ground bearing red dots arranged as corners of squares, supported by a frame and stand carrying a pantographic element, an actuating mechanism controlling the pantographic movement, a locking element, an indicator, charts in duplicate, a recording element, and a pedestal bearing an adjustable chin-rest and a supporting means for color-screens of red and green for either eye.

In the accompanying drawings, constituting a part of this specification, and in which similar reference characters refer to like parts, throughout,—

Figure 1 is a front elevation of the device, showing the supporting frame, pantographic element, actuating mechanism for the control of the pantographic element, fixed orientation chart, removable duplicate recording charts, and the orientation indicator-point borne by the pantographic element, represented as centrally located at the upper edge of the orientation chart;

Figure 2 is a side elevation of the device, showing the relative positions of the pantographic levers, link connections, actuating means for controlling the pantographic elements, locking means for securing the levers in locked relationship, manually operable means for recording selected locations upon the recording charts, and an adjustable means carrying a chin-rest and colored eye-screens;

Figure 3 is an enlarged sectional detail of the locking means for locking the pantographic levers in fixed relationship, while the recording means is being manually actuated to record the oriented point upon the recording chart; and Figure 4 is a diagrammatic view of the color-screens used in connection with the instrument.

Referring with greater particularity to the drawings, and more particularly to Figures 1 and 2, the instrument comprises a supporting frame 1, preferably of cast construction; a pantographic element 2; an actuating mechanism 3, controlling the pantographic movement of the element 2; a locking element 4, adapted to lock the pantographic element 2 in recording position; an indicator-recording mechanism 5, actuated by the movement of the pantographic element and in co-operative association with a chart-bearing member 6 for recordation purposes; an orientation chart 7; and a supporting means 8 for color-screens.

The supporting frame 1 is, preferably, of rectangular form and consists of a base 9, uprights 10, front brackets 11 and rear upright extension members 12. The pantographic element 2 consists of a pair of levers 13 and 14 pivotally secured in the frame 1 by the shaft 15, which is mounted in suitable bearings integrally borne by the frame cross-braces 16 and 17. The levers 13 and 14 are adapted to swing, or oscillate, about the shaft 15 and consist of bridged lower extremities 18 and 19 connected by braces 20 and adapted to oscillate the one within the other, as shown in Figure 2. The extremities 18 and 19 of the levers 13 and 14 are connected at the pivot points 21 and 22 by a pair of bridged link-connections 23 and 24, which are connected at their lower ends by the pintle 25. The levers 13 and 14 are pivotally connected at the points 26 and 27 to a second pair of levers 28 and 29, which levers are pivotally connected together at their upper ends, as shown at 30.

The point 30 of the pantographic element 2 is adapted for vertical movement relative to the shaft 15 and for lateral oscillation relative to said shaft, through the action of the actuating mechanism 3, which mechanism consists of a hand-lever 31 of bell-crank form bearing a bifurcated lower end 32 adapted to embrace the lower end of said shaft 15, to which it is connected by a rigid arm 33 pinned to the shaft at 34 and pivotally bearing the bifurcated end of the lever, as indicated at 35, the lower end of said lever being connected to the pintle 25 of the pantographic element 2 by a link connection 36 and swivel-bracket 37.

The locking mechanism 4 consists of a means for locking the pantographic element 2 and the auxiliary indicator-recording mechanism 5 in position preliminary to the actuation of the chart-bearing member 6, and comprises clamp-members 38 pivotally secured to the ears 39, formed integrally with the frame cross-piece 40, by the pintle 41. The clamp-member 38 is in the form of a bell-crank and is adapted to be held in operative position by means of the compression spring 42 seated in an aperture 43 formed in the cross-piece 40. The clamp-member is held normally inoperative by means of a link connection 44 pivotally connected at its upper end to a short crank-arm 45 rigidly borne by the rod 46, said rod being in turn borne by the frame uprights 10. An operating lever 47 is secured upon the outer end of the rod 46 and normally bears against a pin 48 mounted in its path when the arm 45 and connecting pivotal point of the link 44 pass over the center of the rod 46.

The end of the pintle 21 adjacent the locking mechanism 4 is provided with a segment 49 of arcuate form loosely mounted thereon and adapted to travel in an arcuate course with the extremity 18 of the arm 14 of the pantographic element, the opposite end 50 of said segment being provided with an arcuate slot 51 adapted to accommodate the pintle 22 but to allow of free movement thereon, said segment being adapted for oscillating movement with the pantograph, but at all times travelling in the aperture 52 formed between the cross-piece 40 of the frame and the clamp-member 39 of the locking mechanism, so that upon release of the lever 47, to the dot-and-dash position shown in Figure 3, the clamp-member 38 is released and co-acts with the member 40 to frictionally grip the segment 49 and hold the levers 13 and 14 in any desired position.

The auxiliary recording mechanism 5 consists of a pair of short levers 53 and 54 pivotally secured to the levers 13 and 14 adjacent the shaft 15, and pivotally connected together at their upper ends, as indicated at 55, which point is at all times in alignment with the centers 30 and 15 of the element 2. A prick-point 56 extends rearwardly from the pivot point 55 and travels in a ratio of 1 to 4 relative to the point 30. The chart-bearing member 6 comprises a rectangular plate 57 hingedly secured to the rear of the frame 1 by the rod 58 and adapted to swing from horizontal to vertical position, as shown in Figure 2, into contact with the prick-points 56, but normally resting against a removable stop 59 as shown in full lines. The inner face of the plate 57 is preferably veneered, as indicated at 60, for the reception of a pair of recording charts 61 and 62, one for each eye of a patient, the right chart 62, Figure 1, being shown centrally located upon the plate 57 in readiness for record receiving and secured thereto by any suitable means readily releasable. Each chart is provided with a number of equally spaced lines scored at right angles to each other, forming sixteen squares carrying dots 63 at their points of intersection. Though so shown here, it is obvious that intersecting circular lines with intersections thus marked would serve the purpose equally well. The orientation chart 7 is a fixed black-board 64 secured in place against the upper ends of the upright members 12 of the frame 1, is of rectangular form and scored to conform to that of the recording charts 61 and 62, except that the squares are four times the size of those of the recording chart.

The dots or indicia of the orientation chart 7 being in red are clearly discernable when viewed through the red screen, while, if viewed through the green screen, they become undistinguishable, blending with the black of the background, conditions requiring that the eye to be tested be covered by the red screen 68 of the card 67, with the green screen 66 covering the other eye.

The supporting means 8 comprises a pedestal 69 adapted to rest upon the table-top 70, supported by the brackets 11 of the frame 1, said pedestal bearing an adjustable rod 71 bearing at its upper end a chin-rest 72 and an extension 73 bearing the card 67 carrying the color-screens 66 and 68 in convenient arrangement for use by the patient, as shown in Figure 2. The supporting means may be adjusted to meet requirements, as may also the frame 1, by means of the screw-adjustment 74, which may be mounted upon any convenient standard (not shown). The table-top 70 is provided with an opening 75, through which the hand-lever 31 extends and allows of its free movement in the manipulation of the pantographic element 2.

The operation of the apparatus is as follows: Assuming any point, as 76, Figure 1, as conveniently located and selected for applying the test, and the patient in position, as indicated in Figure 2.

The patient is instructed to direct his eyes upon the chart 7 and with his hand grasping the lever 31, endeavor to move the pantographic element 2, through its associate actuating element 3, in such manner and diverse directions as will bring the indicator point 30 into apparent, or actual, registration with the selected point 76. Upon the accomplishment of this action, the patient rests his efforts and the attendant immediately locks the actuating mechanism, or element, in position, through the thrown and gripping action of the locking mechanism 4, and follows this with swinging the plate 57 from the full line position, shown in Figure 2, to the vertical dotted position and into contact with the prick-points 56, thereby recording upon the chart 62 a point corresponding in position to that indicated by the indicator 30 upon the chart 7. The test, as provided for, may be applied to either eye and repeated indefinitely, registering each attempt at accuracy in orientation, or bringing a movable point into registration with a fixed one, there being provided a separate registration chart for each eye, for later reference in determining their variance from perfect registration, as an index to the degree of lack of co-ordination of normal character in the muscles governing the movements of the eye.

The lower ends of the levers 13 and 14 and links 23 and 24 constituting the pantographic element are weighted to counter-balance the levers 28 and 29 and normally retain point 30 substantially as shown in Figure 1.

I claim:

1. In a device of the character described, the combination with an orientation chart, of a pantographic element adapted to locate points upon said chart, means for the manual actuation of said pantographic element, and means for locking said pantographic element at the instant of location of a selected point.

2. In a device of the character described, the combination of an orientation chart, a pantographic element, an indicating means carried by said pantographic element, means for manually actuating said pantographic element, means for locking said element, a recording chart, and means adapted to register points upon said recording chart corresponding in position to those indicated upon said orientation chart.

3. In a device of the character described, the combination, an orientation chart bearing a plurality of intersecting lines having dots at their points of intersection, and a pantographic element adapted for tracing courses and locating points upon said orientation chart.

4. In a device of the character described, the combination, with an orientation chart bearing a plurality of intersecting lines having dots at their points of intersection, of a pantographic element bearing an indicator and adapted for tracing courses and locating points upon said chart, a recording chart the facsimile of said orientation chart, and means for the operation of said pantographic element relative to both said orientation chart and recording chart.

5. In a device of the character described, the combination, with an orientation chart bearing a plurality of intersecting lines having dots at their points of intersection, of a pantographic element bearing an indicator and adapted for tracing courses and locating points upon said chart, a recording chart the facsimile of said orientation chart and in fixed and similar relationship thereto, means for manually actuating said pantographic element relative to both said orientation chart and recording chart, and means for locking said pantographic element at any desired point in its movement.

6. In a device of the character described, the combination, with an orientation chart bearing a plurality of intersecting lines having dots at their points of intersection, of a pantographic element bearing a point indicator and adapted for tracing and locating points upon said chart, a recording chart the facsimile of said orientation chart and in co-ordinate arrangement therewith, means for manually actuating said pantographic element relative to both said orientation chart and recording chart, means for locking said pantographic element at any desired point in its movement, and means adapted to register points upon said recording chart corresponding in position to those as indicated upon said orientation chart.

7. In a device of the character described, the combination, with an orientation chart, of a counter-balanced pantographic element adapted to locate points upon said chart, lever and link connections for the normal manual actuation of said pantographic element, and means for locking said pantographic element at the instant of location of a selected point.

8. In a device of the character described, the combination, with an orientation chart, of a counter-balanced pantographic element adapted to remain normally extended, manually actuated means, comprising a lever and link connections, whereby the said element may be operated for the location of points upon the said chart, means for locking said element at any selected point, and means for recording said selected point.

In testimony whereof I have affixed my signature.

CLYDE L. HUNSICKER.